June 25, 1935.  N. P. HARSHBERGER  2,006,270
ROOFING AND SIDING ELEMENT
Filed Sept. 24, 1930   6 Sheets-Sheet 1
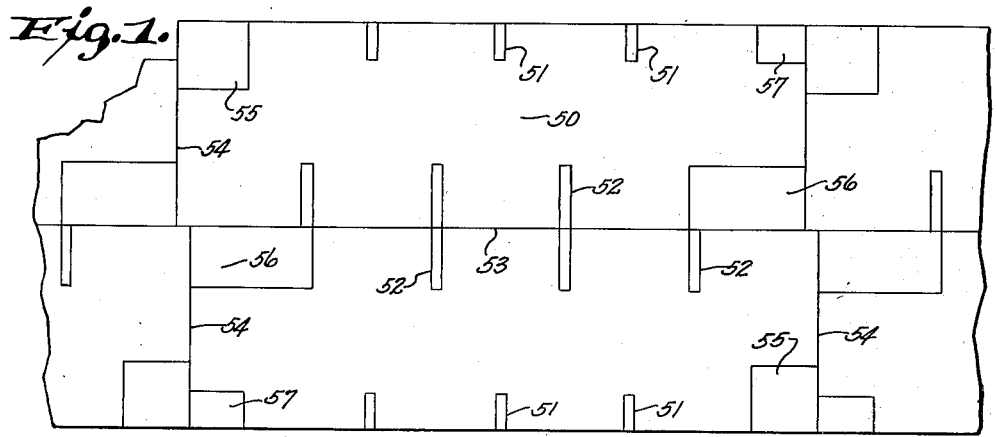
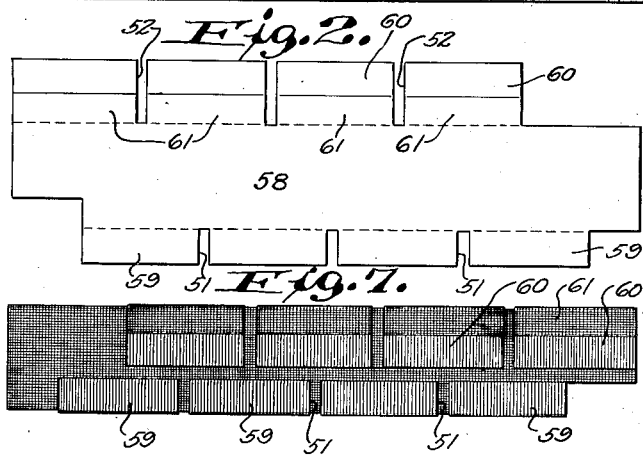
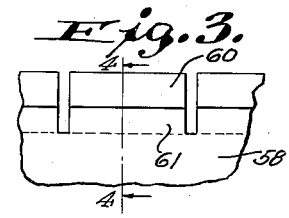
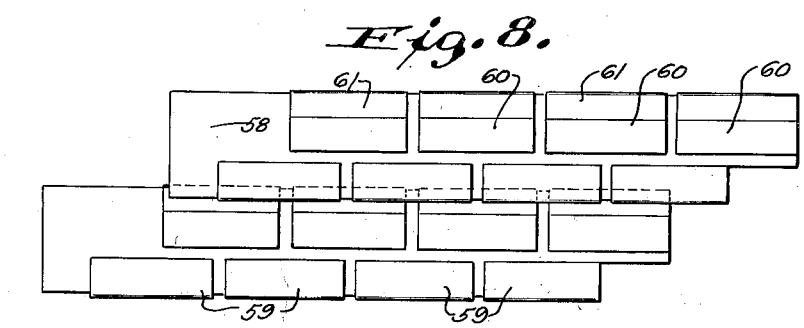
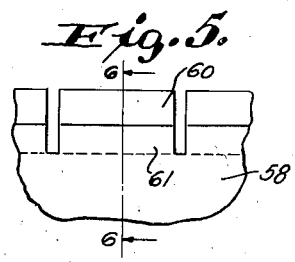
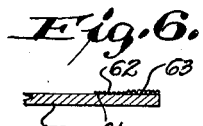
INVENTOR.
Norman P. Harshberger
BY
Morsell & Morsell
ATTORNEYS.

June 25, 1935.  N. P. HARSHBERGER  2,006,270
ROOFING AND SIDING ELEMENT
Filed Sept. 24, 1930  6 Sheets-Sheet 2

INVENTOR.
Norman P. Harshberger
BY
Morsell & Morsell
ATTORNEYS.

June 25, 1935.  N. P. HARSHBERGER  2,006,270
ROOFING AND SIDING ELEMENT
Filed Sept. 24, 1930   6 Sheets-Sheet 3

INVENTOR.
Norman P. Harshberger
BY
Morsell & Morsell
ATTORNEYS.

INVENTOR.
Norman P. Harshberger
BY
Morsell + Morsell
ATTORNEYS.

June 25, 1935.  N. P. HARSHBERGER  2,006,270
ROOFING AND SIDING ELEMENT
Filed Sept. 24, 1930   6 Sheets-Sheet 6

INVENTOR.
Norman P. Harshberger
BY
Morsell & Morsell
ATTORNEYS.

Patented June 25, 1935

2,006,270

UNITED STATES PATENT OFFICE 2,006,270

ROOFING AND SIDING ELEMENT

Norman P. Harshberger, Scarsdale, N. Y., assignor to Bakelite Building Products Co., Inc., New York, N. Y., a corporation of Delaware Application September 24, 1930, Serial No. 484,079

13 Claims. (Cl. 108—7)

This invention relates to improvements in roofing and siding elements.

It is one of the objects of this invention to provide improved roofing and siding elements, manufactured from the usual composition material, which are formed and cut in a novel manner so as to be capable of simulating a plurality of figures when applied to a building, the said elements being particularly adapted to simulate bricks which are separated by mortar.

A further object of this invention is to provide improved roofing and siding elements each embodying a plurality of thicknesses of material so as to furnish maximum protection against snow, rain, and other elements.

A further object of this invention is to provide composition building material of the class described which, due to the plurality of thicknesses utilized therein, possesses unusual rigidity and therefore effectively withstands the action of wind thereon.

A more specific object of this invention is to provide improved roofing and siding elements in which the material is folded upon itself, and in which the folded over portions contrast in appearance, through difference in color or through shadow effects, with the material beneath and cooperate therewith to produce definition line effects.

A further object of this invention is to provide roofing and siding elements which are relatively simple in construction, attractive in appearance, and well adapted for the purpose described.

With the above and other objects in view, the invention consists of the improved roofing and siding elements, and all its parts and combinations, as set forth in the claims, and all equivalents thereof.

In the accompanying drawings, in which the same reference numerals designate the same parts in all of the views;

Fig. 1 is a plan view of a roofing web showing the method of cutting one type of element;

Fig. 2 is a plan view of a single element formed as shown in Fig. 1;

Fig. 3 is a fragmentary plan view of an element of the shape shown in Fig. 2 illustrating a slight modification;

Fig. 4 is a fragmentary sectional view taken on line 4—4 of Fig. 3;

Fig. 5 is a fragmentary plan view of an element of the shape shown in Fig. 2 illustrating another slight modification;

Fig. 6 is a fragmentary sectional view taken on line 6—6 of Fig. 5;

Fig. 7 is a plan view showing the element of Fig. 2 in final folded form;

Fig. 8 is a plan view showing an assembly of a plurality of elements of the type illustrated in Fig. 7;

Figure 9:
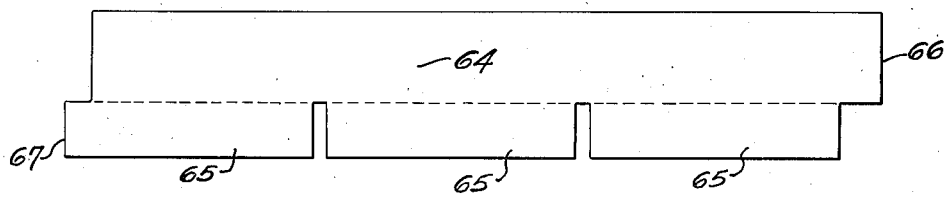
Fig. 9 is a plan view of a cut element illustrating a modified form of the invention.

Referring to Figs. 1 to 8 of the drawings, the numeral 50 designates a roofing web which has its edges cut as at 51 to form a plurality of inwardly extending, spaced apart, slots, and which has its intermediate portion cut as at 52 to form other spaced and longer slots which are offset from the slots 51. The web is further cut along a longitudinal line 53 which bisects the slots 52, and along irregular transverse lines 54. Waste portions 55, 56 and 57, which alternate in position on the web, are cut out adjacent the transverse lines 54. In Fig. 1, the rear of the web is shown, and said rear may be uncoated, or it may be covered with a layer of asphalt alone, or with asphalt and crushed mineral material, the latter if used being preferably of a contrasting color from that used on the other side of the web. The web may be of a width to produce any number of elements.

In Fig. 2, the reverse side of one of the elements as cut from the web is shown. Said element comprises a body portion 58 having spaced apart rectangular tabs 59 projecting from its lower edge, and having deeper tabs 60 projecting from its upper edge. The body portion 58 and spaces 61 adjacent the inner edges of the tabs 60 may be unsurfaced, or they may be coated with asphalt. The tabs 59 and the remainder of the tabs 60 are coated with asphalt and with crushed mineral of a color which contrasts with the reverse side of the element, so that when the tabs are folded, as shown in Fig. 7 there will be an effect of a plurality of bricks separated by mortar. The folded over tabs are cemented or otherwise secured to the material below to form elements having a major portion of double thickness. The elements are assembled as illustrated in Fig. 8, being arranged in courses with the ends of adjacent elements overlapping to carry out the brick-like effect. The lower edge of one course aligns with the upper edge of the surfaced portion of the tabs 60 resting on the portion 61. Said lower edge may be slightly spaced from the upper edge of the surfacing on the tabs 60 to leave a space which simulates mortar therebetween.

In Figs. 3 and 4 a slight modification is shown in which the spaces 61 at the inner edges of the tabs 60 are depressed to more readily receive the lower edge of an element above and to form a shoulder adjacent said edge. In Figs. 5 and 6 another slight modification is illustrated in which the spaces 61 of the tabs 60 are covered with mineral material 62 which is of less coarseness than the mineral material 63 used on the rest of the tabs 60.

From the above it may be seen that a very attractive brick-like effect is created. This may be carried out by utilizing red mineral material on the tabs 59 and 60 and by having the background and the spaces 61 of a black color. In the modification shown in Figs. 5 and 6 the fine mineral material 62 is also preferably of a contrasting color from the mineral material 63.

Figure 10:
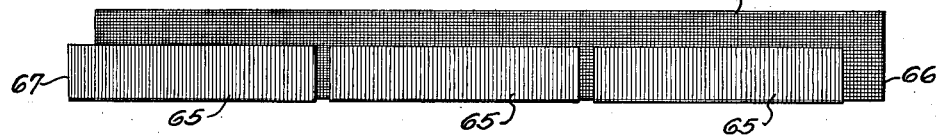
Fig. 10 is a plan view of the element of Fig. 9 in final folded form.

Referring to Figs. 9 to 12 inclusive, it will be seen that the element herein illustrated has a body portion 64 and spaced apart rectangular tabs 65 which project from its lower edge only. Said element also has one end formed with an upper tab extension 67 and has its other end formed with a lower body extension 66. The tabs are arranged to be folded upwardly on the body portion 64 as shown in Fig. 10 and are adapted to be cemented or otherwise secured thereto. The exposed surfaces of the folded-over tabs may be coated with mineral material which contrast in color from the background. Also the body portion above the tabs may be of less depth than the tab depth as by the illustrated construction the joints between assembled elements in a course may be substantially obscured and protected.

Figure 11:
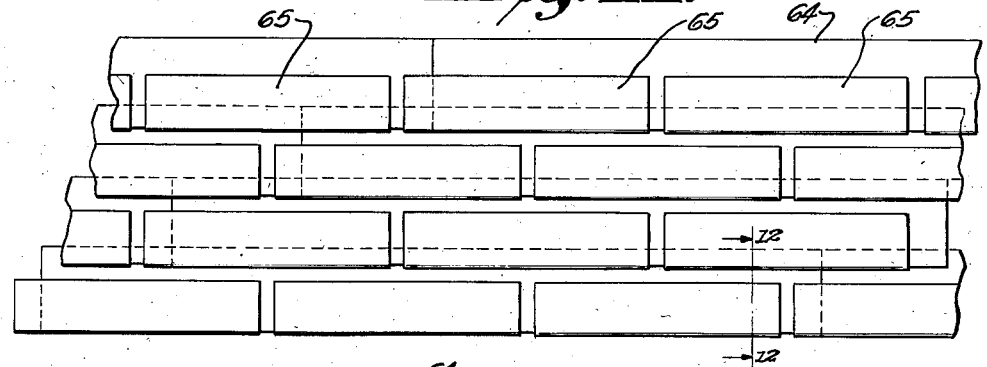
Fig. 11 is a plan view showing an assembly of a plurality of elements of the type illustrated in Fig. 10.
Figure 12:
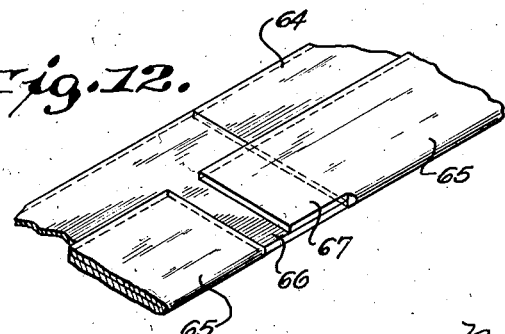
Fig. 12 is an enlarged fragmentary perspective view taken on line 12—12 of Fig. 11.
Figure 13:
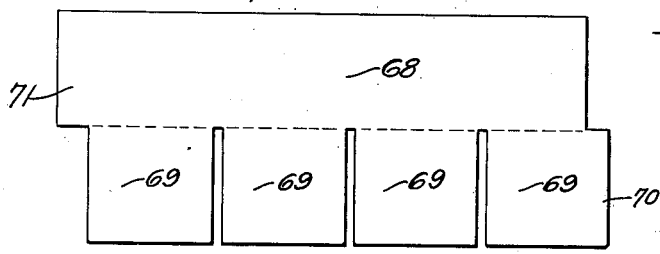
Fig. 13 is a plan view of a cut element illustrating another modification.

The units shown in Fig. 10 are assembled in the manner illustrated in Fig. 11 with the projecting portion 67 of one element over-lapping the projecting portion 66 of an adjacent element in the same course, its end being thereby spaced from the adjacent tab the same distance as are the spaces between the tabs. The lower edge of one element is adapted to rest upon the upper edge of the body of an element below and to be spaced from the upper edges of the tabs.

Figure 15:
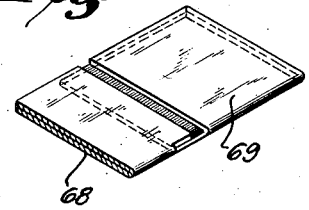
Fig. 15 is an enlarged sectional view taken on line 15—15 of Fig. 14 and shown in perspective.
Figure 14:
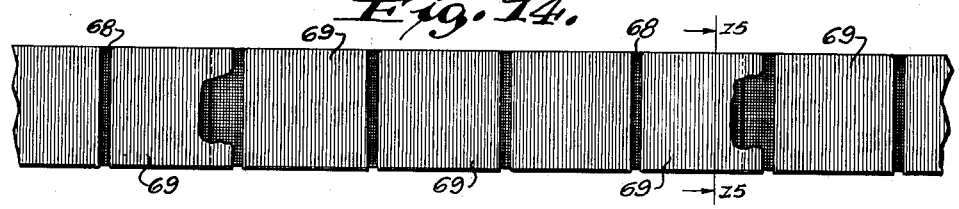
Fig. 14 is a plan view showing a plurality of the elements of Fig. 13 in final folded form, arranged in a row with interconnected ends.

Referring to Figs. 13 to 16, it will be seen that the element herein illustrated comprises a body portion 68 having a plurality of spaced apart tabs 69 projecting from its lower edge, said tabs being preferably of the same width as the body portion 68. It will be noted that the tab at one end is offset from the end of the body as at 70, and that the body at the other end is offset from the edge of the adjacent tab as at 71. The tabs 69 are folded upon the body portion as shown in Fig. 14 and are cemented or otherwise secured thereto. The projecting portion 70 of the end tab of one element overlaps in assembly the projecting portion 71 of the body of an adjacent element in the same course as shown in Figs. 14 and 15.

Figure 16:
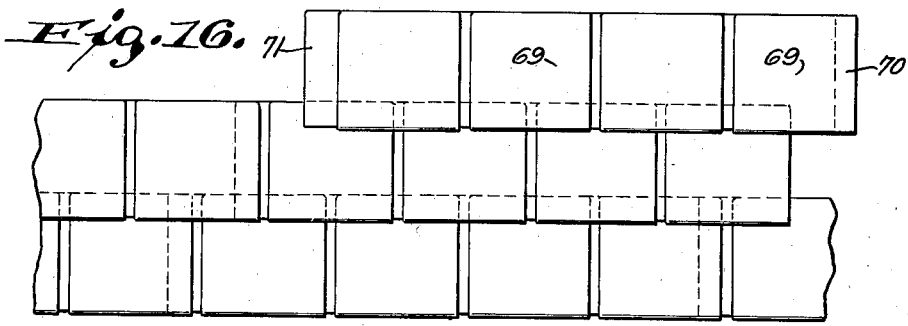
Fig. 16 is a plan view of an assembly of a plurality of the elements of Fig. 14.

The lower edge of one course of elements overlaps the upper edge of a course below, and the spaces between the tabs are offset from one another as shown in Fig. 16.

Figure 17:
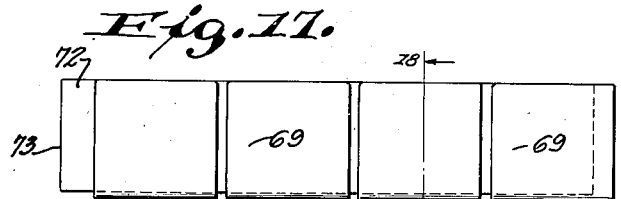
Fig. 17 is a plan view of an element like that of Fig. 14 but embodying an intermediate filler layer.
Figure 18:
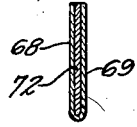
Fig. 18 is a sectional view taken on line 18—18 of Fig. 17.
Figure 19:
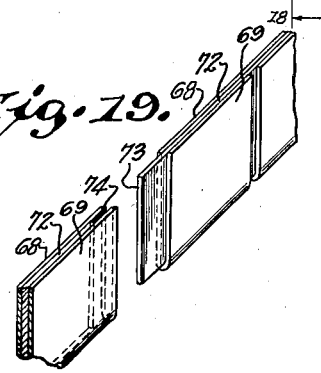
Fig. 19 is a fragmentary perspective view illustrating the method of interconnecting the ends of adjacent elements of Fig. 17.
Figure 20:
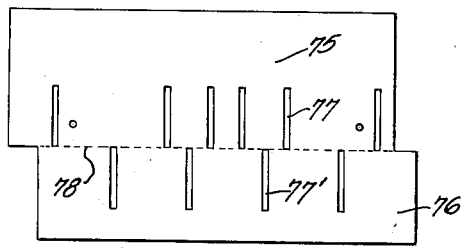
Fig. 20 is a plan view of a cut element illustrating another modification.

In Fig. 17 the same type of element is illustrated, said element however having a layer of filler material 72 positioned between the folded over tabs 69 and the body portion 68. Said filler material may be of cork, or may be of any fibrous or mineral material which will improve the insulating qualities of the element. The filler material is preferably positioned so that it projects from one end as at 73 leaving a recess 74 in the other end of the element. Thus, when the elements are assembled the projection 73 of one may enter the recess 74 of an adjacent element to form an interlocking engagement as shown in Fig. 19.

Figure 21:
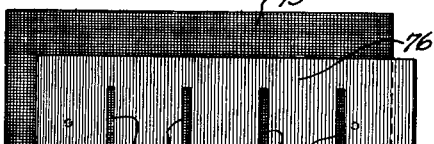
Fig. 21 is a plan view of one side of said element when in folded form.
Figure 22:
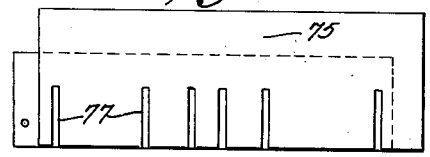
Fig. 22 is a plan view of the reverse side thereof.
Figure 23:
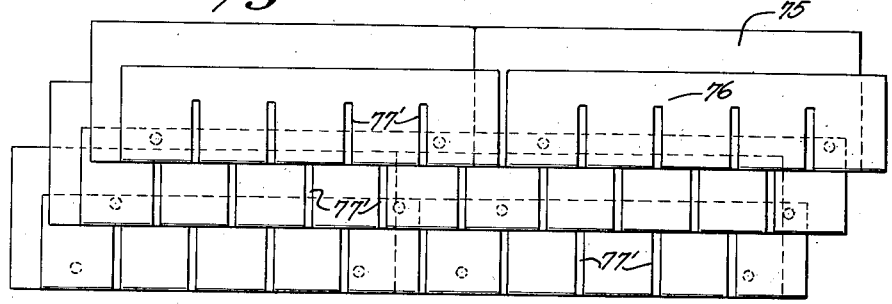
Fig. 23 is a plan view of an assembly of elements of Fig. 21.

Referring to Figs. 20 to 23, it will be seen that the element herein illustrated comprises a body portion 75 and an offset foldable portion 76. The body portion 75 is provided with a plurality of inwardly extending, irregularly spaced slots 77, one end of each of said slots terminating on the line of fold 78 and the other end extending inwardly to the body for a distance. The foldable portion 76 is also provided with slots 77', which are preferably equally spaced and which extend from the line of fold 78. The portion 76 is folded on the body 75, and cemented or otherwise secured thereto as shown in Fig. 21. If desired, however, the elements may be folded during assembly without being permanently secured. The elements of Fig. 21 may be laid on a roof as shown in Fig. 23 with the offset ends of elements in the same course overlapping and with the lower edge of one course overlapping the folded portion of a course below, the slots 77 being offset from one another. To bring out a shingle or brick-like effect, the exposed portion of the folded parts 76 may be surfaced with a material which contrasts with the background showing through the slots.

If desired, the elements may be reversed as shown in Fig. 22 and laid in a similar manner to produce a plurality of unequal figures.

Figure 24:
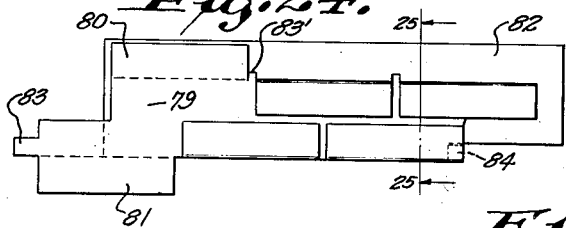
Fig. 24 is a plan view of another modified form of element, parts being unfolded, showing the use of a backing sheet.
Figure 25:
Fig. 25 is an enlarged sectional view taken on line 25—25 of Fig. 24.
Figure 26:
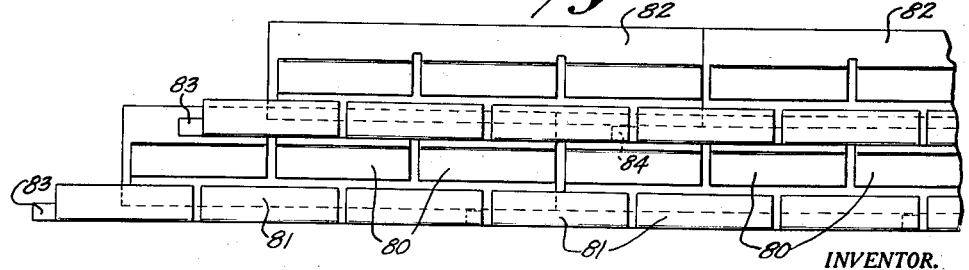
Fig. 26 is a plan view of an assembly of elements of Fig. 24.

In Figs. 24 to 26 inclusive, elements of the same general type as that shown in Figs. 1 and 2 are shown. Said elements embody a body portion 79 having spaced apart tabs 80 projecting from the upper edge and spaced apart offset tabs 81 projecting from the lower edge. The body portion 79 is cemented or otherwise secured to a backing sheet 82 and the tabs are folded toward one another as shown in Fig. 24, and are secured to the body portion 79. It is to be noted that between the upper tabs 80 there are spacing projections 83' which project above the folded portion of the tabs. At one end of the body portion 79 a tongue 83 is formed and at the other end below the folded over tab there adjacent is a recess 84. In assembly the tongue 83 of one element enters the recess 84 to properly position adjacent elements in the same course. One course of elements is laid with its lower edge overlapping the backing sheet 82 of the course below and abutting against the spacing projections 81. The exposed portions of the tabs 80 and 81 are surfaced with mineral which contrasts with the body portion 79 and with the backing sheet 82 so that a brick-like effect is created.

Figure 27:
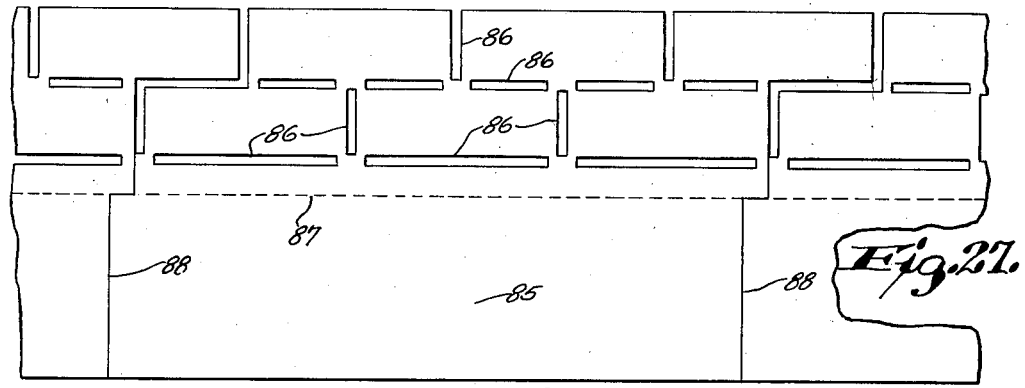
Fig. 27 is a plan view of a web showing the method of cutting still another type of element.
Figure 28:
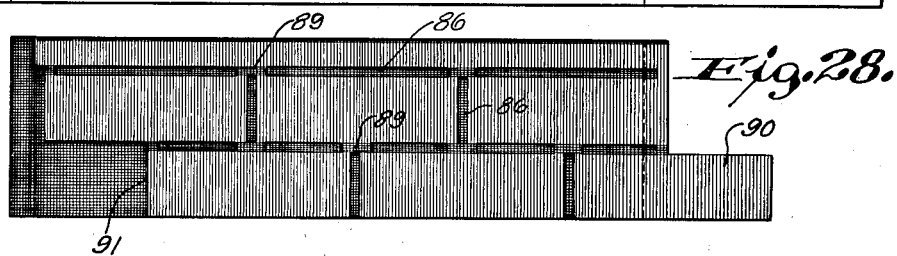
Fig. 28 is a plan view of one of the cut elements in final folded form.
Figure 29:
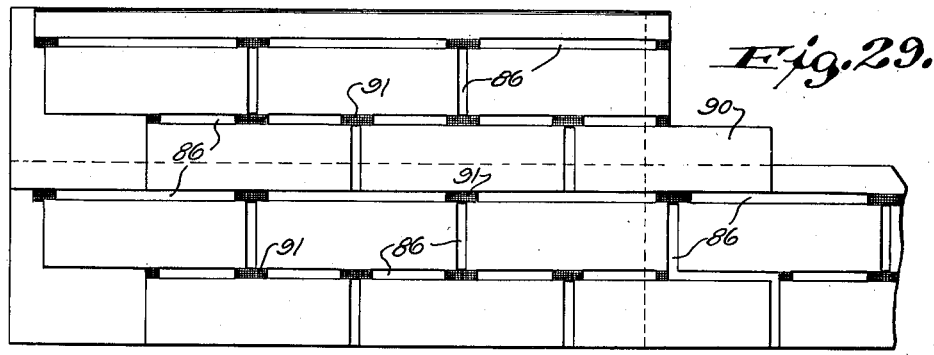
Fig. 29 is a plan view of an assembly of a plurality of elements of Fig. 28.

Referring to Figs. 27 to 29, this type of element is cut from a web 85. Said web has one side formed with a plurality of cut-out slots 86 arranged in stencil-like form to simulate bricks. The web may be scored longitudinally on an intermediate line 87 to facilitate folding, and it is cut on irregular transverse lines 88. The upper half of each cut element is then folded downwardly on the body as shown in Fig. 28, the exposed portion being surfaced with material which contracts with the material showing through the slots. However, in order to create a continuous effect of mortar lines, the spaces 89 between adjacent slots may be surfaced and colored with material which corresponds with the material showing through the slots. One end of the folded over portion is formed with a projecting tongue 90 and the other end with a recess 91. In assembly the tongue 90 of one element fits within the recess 91 of an adjacent element in the same row, its edges however being spaced from the edges of the recess 91 the same distance as the width of the slots. One course of elements is laid with its lower edge aligning with the upper edge of the top row of longitudinal slots of a course of elements below as shown in Fig. 29. The folded over portion may be secured to the body or it may be folded during assembly.

Figure 31:
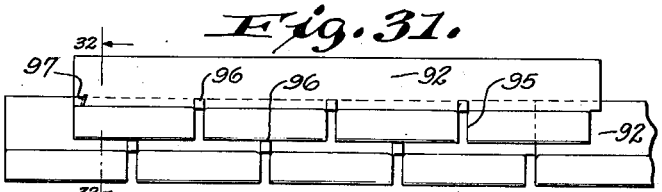
Fig. 31 is a plan view of an assembly of a plurality of the elements cut as illustrated in Fig. 30.
Figure 32:
Fig. 32 is an enlarged sectional view taken on line 32—32 of Fig. 31.
Figure 30:
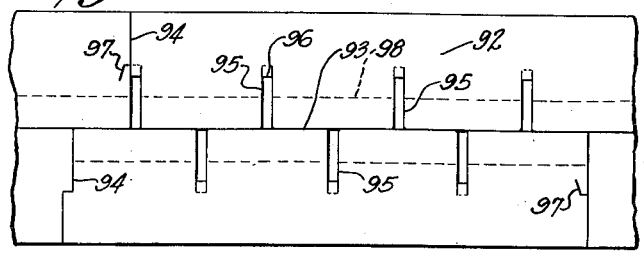
Fig. 30 is a plan view of a web showing the method of cutting another modified form.
Figure 33:
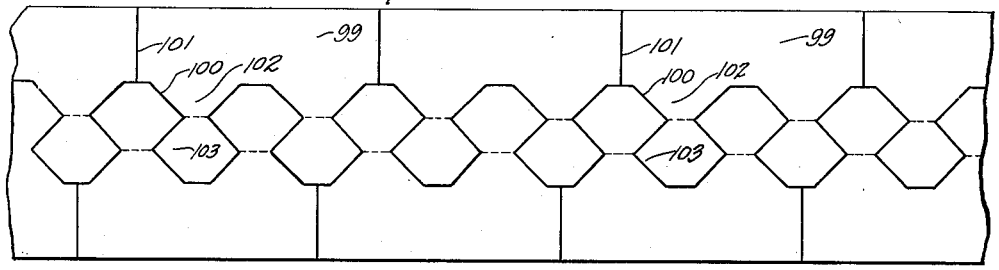
Fig. 33 is a plan view of a web showing the method of cutting another type of element.

Referring to Figs. 30 to 32 inclusive, this type of element is cut from a web 92. Said web is cut along a longitudinal intermediate line 93 and along irregular transverse lines 94. Slots 95 are cut out in each direction from the longitudinal line 93, the slots on one side of the line being staggered with respect to the slots on the other side. A portion of material 96 at the end of each slot is left foldably connected to the end thereof. Adjacent the transverse lines of the cut 94 slits 97 are cut to form tongues. The elements formed from each side of the web are folded along the lines 98, as shown in Fig. 31, and the portions 96 at the ends of the slots are folded upwardly to form spacing means. All of said folded portions may be cemented or otherwise secured to the body. The elements are assembled as shown in Fig. 31 with the lower edge of one element abutting against the spacing means 96 and with the tongues formed by the slits 97 engaging beneath the upper edge of the body of an element below as shown in detail in Fig. 32. The folded over portions are preferably surfaced with material which contrasts with that used on the body and showing between the slots.

Figure 34:
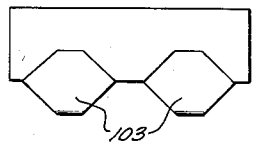
Fig. 34 is a plan view of one of said elements in folded form.
Figure 35:
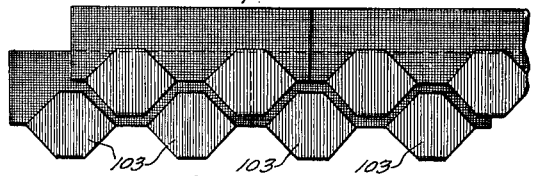
Fig. 35 is a plan view showing one manner of assembling said elements.

Referring to Figs. 33 to 37 inclusive, this type of element is cut from a web 99. Said web is cut along an irregular longitudinal line 100 and along irregular transverse lines 101 to form a plurality of elements from each side of the web having a plurality of semi-hexagons 102 and attached full hexagons 103 projecting from the lower edge. The hexagons 103 may be folded upon the body as shown in Fig. 34, and a plurality of said elements may be assembled as shown in Fig. 35 with the lower edge of one element spaced from the edges of the folded over portions of an element below. The folded over portions may be surfaced with material which contrasts in color with that used on the main portion of the body so that the effect is that of a plurality of hexagonal figures separated by relatively wide definition lines.

Figure 36:
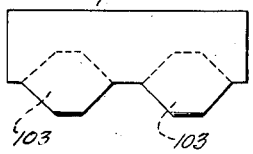
Fig. 36 is a plan view of an element like that of Fig. 34 with the tabs folded underneath.
Figure 37:
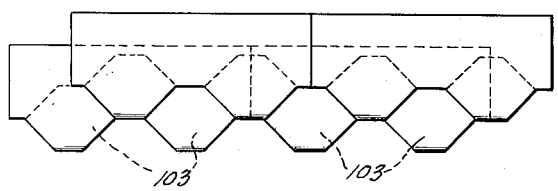
Fig. 37 is a plan view of an assembly of a plurality of the elements of Fig. 36.

The element may also be used as shown in Figs. 36 and 37 with the hexagonal projections 103 folded underneath instead of on top. The elements may then be laid in the usual manner as shown in Fig. 7 with the lower edges of the projections of one element registering with the inner space edges of an element below, the folded under portions providing an extra thickness of material.

This type of element of Fig. 34 may also be manufactured with an additional hexagonal projection joined to the lower edge of each projection 103 so that there will be a double fold, and so that the exposed portion of the folded hexagon will be from the front side of the material. This would eliminate the necessity of surfacing a portion of the rear of the web.

Figure 38:
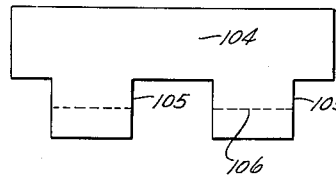
Fig. 38 is a plan view of an additional modified form.
Figure 40:
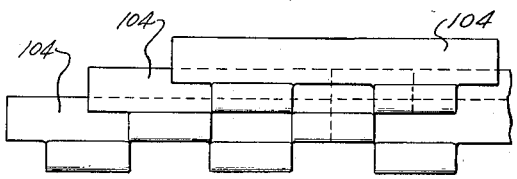
Fig. 40 is a plan view of an assembly of the elements of Fig. 39.
Figure 39:
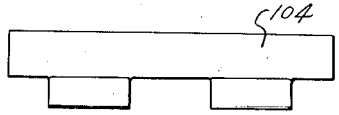
Fig. 39 is a plan view of said element in folded form.

Referring to Figs. 38 to 40, the element herein shown comprises a substantially rectangular body 104 having spaced apart rectangular projections 105 at its lower edge. Said projections are preferably scored along the line 106 to permit folding of the lower half of each projection as shown in Fig. 39. Said folded portions may be secured in folded position. The elements are laid as shown in Fig. 40 with the lower edges of the folded projections registering with the inner space edges of an element below to create a plurality of rectangular or brick-like figures.

Although all of the forms have been shown as embodying a predetermined number of figures, any of said forms may be manufactured in roll form to provide continuous strips of roofing and siding material. The dimensions of the body may also be changed as desired to provide for varied thicknesses in assembly and to vary the quantity of material necessary to cover the standard roofing unit of 100 square feet.

If desired, the folded portions of the various units may be reinforced by the use of tape or other reinforcing means along the line of fold.

From the above, it may be seen that a very novel form of roofing and siding element has been provided which will produce an effect of sharply defined figures without the use of any of the ordinary painting on said elements to bring out the figures. It will be further seen that in all of the forms there are substantial areas of double thickness to provide additional protection against weather.

What I claim is:

1. Building material comprising an elongated body portion forming a base, tabs foldable toward one another from opposite longitudinal edges of said base to a superimposed position thereon wherein the lines of fold are in line with the upper and lower edges of the finished product, said tabs being separated by intervening transverse spaces which form spaced apart depressions defining a plurality of raised figures formed by the superimposed tabs, and said superimposed tabs on the two edges terminating short of meeting to provide a depressed longitudinal definition line for cooperation with the transverse depressions in setting off the figures formed.

2. Building material comprising an elongated body portion forming a base, tabs foldable toward one another from opposite longitudinal edges of said base to a superimposed position thereon wherein the lines of fold are in line with the upper and lower edges of the finished product, said tabs being separated by intervening transverse spaces which form spaced apart depressions defining a plurality of raised brick-like figures formed by the superimposed tabs, and said superimposed tabs on the two edges terminating short of meeting to provide a depressed longitudinal definition line extending at substantially right angles to said transverse depressions to cooperate with the latter in setting off the brick-like figures formed.

3. Building material comprising an elongated body portion forming a base, tabs foldable toward one another from opposite longitudinal edges of said base to a superimposed position thereon wherein the lines of fold are in line with the upper and lower edges of the finished product, said tabs being separated by intervening transverse spaces offset from one another on the two sides of the material which form spaced apart depressions defining a plurality of raised figures formed by the superimposed tabs, and said superimposed tabs on the two edges terminating short of meeting to provide a depressed longitudinal definition line for cooperation with the transverse depressions in setting off the figures formed.

4. Building material comprising an elongated body portion forming a base, tabs foldable toward one another from opposite longitudinal edges of said base to a superimposed position thereon wherein the lines of fold are in line with the upper and lower edges of the finished product, said tabs being separated by intervening transverse spaces to form spaced apart depressions defining a plurality of raised figures formed by the superimposed tabs, the upper superimposed tabs being of greater depth than the lower tabs to provide for overlapping of one element by a like element of a course above.

5. Building material comprising an elongated body portion forming a base, tabs foldable toward one another from opposite longitudinal edges of said base to a superimposed position thereon wherein the lines of fold are in line with the upper and lower edges of the finished product, said tabs being separated by intervening transverse spaces to form spaced apart depressions defining a plurality of raised figures formed by the superimposed tabs, the upper superimposed tabs being of greater depth than the lower tabs to provide for overlapping of one element by a like element of a course above, the portions of the base which are exposed by the spaces and the upper portions of the upper superimposed tabs being formed to create a contrasting effect with relation to the other portions of the tabs, the surface of said upper portion of the upper tabs being in a plane below the surface of the other portion of said tabs.

6. A building element comprising a substantially flat non-metallic body portion forming a base, said base having an offset projection at one end, material superimposed on said base to form two offset lines of raised figures, said lines of raised figures being spaced apart and each figure being spaced from adjacent figures to expose the material of the base below, one end figure being spaced from the end of the base to provide a substantially flat base portion to be overlapped in assembly and another end figure of the upper line extending beyond a lower line of figures and over the offset projection of the base, and a portion of the base being exposed below said extending figure to provide a depressed and projecting definition line, said offset base portion and extending end figure adapted to overlap the opposite end of an adjacent element in the same course with the projecting definition line below the extending figure substantially abutting the lower line of figures of said element to aline the lines of figures.

7. A building element comprising a non-metallic body portion forming a base, said base having an offset projection at one end, material superimposed on said base to form two offset lines of brick-like figures, said lines being spaced apart and each figure being spaced from adjacent figures to expose the material of the base below in a manner to simulate mortar between the figures, the end figure of the upper line extending above the offset projection of the base and the opposite end figure spaced a substantial distance from the base end to provide an uncovered lap portion for assembly and a portion of the base being exposed below said first-mentioned figure to provide a depressed and projecting mortar-like line which with the projecting end of the figure is adapted to overlap the uncovered base end of an adjacent element in the same course.

8. A building element comprising a substantially flat body portion forming a base having an offset projection at one end, material superimposed on said base to form two offset lines of raised figures the opposite ends of which lines are complementary, said lines of raised figures being spaced apart and each figure being spaced from adjacent figures by intervening flat depressions, the end figure of the upper line extending over the offset projection of the base, and a portion of the base projecting from said end figure to provide a depressed and projecting definition line, which, with the projecting end of the figure is adapted to cooperate with the opposite end of an adjacent element in the same course to aline the elements and courses of figures, and the thickness of the projecting portion of the base being such as to adapt it to form a depression between its overlying figures and an adjacent figure on said adjacent element.

9. A building element comprising an elongated body portion forming a base, tabs foldable toward one another from opposite longitudinal edges of said base to a superimposed position thereon, said tabs being separated by intervening transverse spaces to form spaced apart depressions defining a plurality of raised figures formed by the tabs, the upper tabs being of greater depth than the lower tabs and having a surfacing thereon extending upwardly from their lower edges and of a depth substantially equal to the depth of the lower tabs, the upper portions of said upper tabs providing for overlapping of one element by a like element of a course above and the portions of the base exposed by the spaces being of a contrasting effect with relation to the exposed tabs.

10. A surface covering comprising overlapping horizontal courses of building elements, said elements comprising elongated body portions forming bases, folded tabs superimposed upon the bases along edges thereof forming longitudinal courses of raised brick-like figures with the lines of fold substantially in line with the edges of the elements, the superimposed tabs separated by intervening transverse spaces to form spaced apart transverse depressions partially defining the raised figures, the elements being assembled with longitudinally extending depressions co-operating with the transverse depressions to complete the outline of the raised figures, the longitudinal and transverse depressions being of a contrasting appearance from the raised figures, to thereby present a surface of raised brick-like figures separated by depressed longitudinal and transverse mortar joints.

11. A surface covering comprising overlapping horizontal courses of building elements, said elements comprising elongated body portions forming bases, folded tabs presenting longitudinal courses of raised figures, superimposed upon the bases along edges thereof wherein the lines of fold are substantially in line with said edges, the superimposed tabs separated by intervening transverse spaces of contrasting effect from the superimposed tabs to form spaced apart transverse depressions partially defining the raised figures, other depressions of similar effect to the transverse depressions extending longitudinally adjacent the raised figures to cooperate with the transverse depressions in setting off the figures formed, the courses being laid with the transverse depressions of courses staggered with the transverse depressions of adjacent courses and also being laid with the elements of each course overlapping the longitudinal depressed portions of subjacent elements and with their lower edges spaced from the upper margin of the raised figures of subjacent elements by longitudinal strips of the depressed portions, thereby presenting a surface of raised figures separated by horizontal and transversely extending depressions of contrasting effect from the figures.

12. A building element comprising an elongated base portion, a plurality of configurations of substantial size but of less depth than the base portion and of the same base material superimposed upon a face of the base to be exposed when laid and presenting the reverse side of said base material, said configurations comprising folded tab portions of the base integrally connected therewith at the lines of fold, which lines of fold are in line with the lower edge of the finished product and said configurations being separated by narrow depressions substantially coextensive with the depth thereof and presenting the exposed surface of the base portion, and said depressions comprising the slots between tabs prior to folding, the element being provided with end lap portions for substantially obscuring the joint between elements when laid, comprising an end figure extending beyond one end of the base and an opposite end base portion free of a configuration, and the portion of the base exposed above the figures having a depth less than the depth of the figures.

13. A surface covering comprising overlapping horizontal courses of building elements, the elements comprising a non-metallic body portion forming a base, said base having an offset projection at one end; material of contrasting appearance to the base overlying the base to form a plurality of lines of raised figures with certain adjacent lines in offset relation and with the lines of raised figures and adjacent figures in a line being spaced apart to form depressed definition lines exposing the material of the base below; an end figure of a line extending beyond an adjacent line of figures and overlying a portion of the offset base projection exposed adjacent the extending figure thereover to provide a depressed and projecting definition line of similar effect to the spaces between the raised figures, and another end figure being spaced from the opposite end of the element base to provide a substantially flat base portion to be overlapped by the offset projection of an adjacent element; the elements being assembled with the offset base portion and overlying raised figure overlapping the substantially flat base portion at the opposite end of an adjacent element, and with the extending base portion adjacent the end figure on the offset base projection substantially abutting an adjacent raised figure of the overlapped adjacent element to form a continuous surface of raised figures separated by depressed definition lines of contrasting effect.

NORMAN P. HARSHBERGER.